(12) United States Patent
Monro

(10) Patent No.: US 9,846,739 B2
(45) Date of Patent: Dec. 19, 2017

(54) FAST DATABASE MATCHING

(75) Inventor: Donald Martin Monro, Beckington (GB)

(73) Assignee: FotoNation Limited, Galway (IE)

( * ) Notice: Subject to any disclaimer, the term of this patent is extended or adjusted under 35 U.S.C. 154(b) by 206 days.

(21) Appl. No.: 13/295,560

(22) Filed: Nov. 14, 2011

(65) Prior Publication Data

US 2012/0136872 A1 May 31, 2012

Related U.S. Application Data

(63) Continuation-in-part of application No. 11/585,365, filed on Oct. 23, 2006, now abandoned.

(51) Int. Cl.
*G06F 17/30* (2006.01)

(52) U.S. Cl.
CPC .............................. *G06F 17/30675* (2013.01)

(58) Field of Classification Search
CPC ...................... G06F 17/30542; G06F 17/30675
USPC ......................................................... 707/780
See application file for complete search history.

(56) References Cited

U.S. PATENT DOCUMENTS

| | | | |
|---|---|---|---|
| 3,845,466 A | 10/1974 | Hong | |
| 4,641,349 A | 2/1987 | Flom et al. | |
| 4,817,183 A | 3/1989 | Sparrow et al. | |
| 4,896,363 A | 1/1990 | Taylor et al. | |
| 5,251,131 A | 10/1993 | Masand et al. | |
| 5,291,560 A | 3/1994 | Daugman | |
| 5,572,596 A | 11/1996 | Wildes et al. | |
| 5,631,971 A | 5/1997 | Sparrow et al. | |
| 5,701,459 A * | 12/1997 | Millett et al. | 395/603 |
| 5,751,836 A | 5/1998 | Wildes et al. | |
| 5,841,888 A | 11/1998 | Setiak et al. | |
| 5,901,238 A | 5/1999 | Matsushita | |
| 5,924,094 A | 7/1999 | Sutter | |
| 5,956,122 A | 9/1999 | Doster | |
| 5,978,793 A | 11/1999 | Kashyap et al. | |

(Continued)

FOREIGN PATENT DOCUMENTS

| | | |
|---|---|---|
| DE | 19842572 | 3/2000 |
| EP | 1237117 A | 9/2002 |

(Continued)

OTHER PUBLICATIONS

Hull, J.; "Document Image Matching and Retrieval With Multiple Distortion-Invariant Descriptors"; International Association for Pattern Recognition Workshop on Document Analysis Systems; XX, XX, 1995; XP002358354; pp. 379-396.

(Continued)

*Primary Examiner* — Neveen Abel Jalil
*Assistant Examiner* — Dawaune Conyers

(57) ABSTRACT

A method of improving the speed with which a sample data record can be matched against records in a database comprises defining a list of possible key values (430), testing those key values against the sample and, for each record in the database, counting the number of key values that match both the record and the sample at reference positions selected by a mask. A list of possible matches is then selected on the basis of that count, for more detailed matching or analysis. Such a method provides very fast matching at the expense of some additional effort when registering a new record within the database.

18 Claims, 6 Drawing Sheets

(56) References Cited

U.S. PATENT DOCUMENTS

| | | |
|---|---|---|
| 6,018,739 A | 1/2000 | McCoy et al. |
| 6,067,369 A | 5/2000 | Kamei |
| 6,081,620 A | 6/2000 | Anderholm |
| 6,144,754 A | 11/2000 | Okano et al. |
| 6,229,906 B1 | 5/2001 | Pu et al. |
| 6,243,492 B1 | 6/2001 | Kamei |
| 6,247,813 B1 | 6/2001 | Kim et al. |
| 6,301,376 B1 | 10/2001 | Draganoff |
| 6,360,021 B1 | 3/2002 | McCarthy et al. |
| 6,424,727 B1 | 7/2002 | Musgrave et al. |
| 6,505,193 B1 | 1/2003 | Musgrave et al. |
| 6,526,160 B1 | 2/2003 | Ito |
| 6,556,710 B2 | 4/2003 | Pass et al. |
| 6,614,919 B1 | 9/2003 | Suzaki et al. |
| 6,697,949 B1 | 2/2004 | Philyaw et al. |
| 6,701,313 B1 | 3/2004 | Smith |
| 6,714,665 B1 | 3/2004 | Hanna et al. |
| 6,757,411 B2 | 6/2004 | Chau |
| 6,801,661 B1 | 10/2004 | Sotak et al. |
| 6,879,718 B2 | 4/2005 | Hullender |
| 6,909,808 B2 | 6/2005 | Stanek |
| 7,009,495 B2 | 3/2006 | Hughes et al. |
| 7,136,514 B1 | 11/2006 | Wong |
| 7,197,166 B2 | 3/2007 | Jeng |
| 7,269,277 B2 | 9/2007 | Davida et al. |
| 7,302,087 B2 | 11/2007 | Cho |
| 7,379,567 B2 | 5/2008 | Azuma et al. |
| 7,483,569 B2 | 1/2009 | Bhagavatula et al. |
| 7,523,098 B2 | 4/2009 | Hirsch et al. |
| 7,650,020 B2 | 1/2010 | Monro |
| 7,809,747 B2 | 10/2010 | Monro |
| 2001/0056485 A1 | 12/2001 | Barrett et al. |
| 2002/0059197 A1 | 5/2002 | Hunter et al. |
| 2002/0129012 A1 | 9/2002 | Green |
| 2002/0163506 A1 | 11/2002 | Matusis |
| 2003/0061233 A1 | 3/2003 | Manasse et al. |
| 2003/0086617 A1 | 5/2003 | Huang |
| 2004/0165755 A1 | 8/2004 | Hillhouse |
| 2004/0202355 A1 | 10/2004 | Hillhouse |
| 2005/0097131 A1 | 5/2005 | Benco et al. |
| 2005/0102325 A1 | 5/2005 | Gould et al. |
| 2005/0175225 A1 | 8/2005 | Shinzaki |
| 2005/0193016 A1 | 9/2005 | Seet et al. |
| 2005/0234901 A1 | 10/2005 | Caruso |
| 2006/0026128 A1 | 2/2006 | Bier |
| 2006/0104493 A1 | 5/2006 | Hsieh et al. |
| 2006/0147094 A1 | 7/2006 | Yoo |
| 2006/0222212 A1 | 10/2006 | Du et al. |
| 2007/0036397 A1 | 2/2007 | Hamza |
| 2007/0201728 A1 | 8/2007 | Monro |
| 2007/0276853 A1 | 11/2007 | Hamza |
| 2008/0097992 A1 | 4/2008 | Monro |
| 2008/0170759 A1 | 7/2008 | Monro |
| 2008/0170760 A1 | 7/2008 | Monro |
| 2009/0060348 A1 | 3/2009 | Monro |
| 2010/0166265 A1 | 7/2010 | Monro |
| 2011/0249872 A1 | 10/2011 | Monro |

FOREIGN PATENT DOCUMENTS

| | | |
|---|---|---|
| EP | 1403811 A | 3/2004 |
| EP | 1956517 A1 | 8/2008 |
| GB | 2473313 A | 3/2011 |
| WO | 02/65782 A1 | 8/2002 |
| WO | 2005/119581 A1 | 12/2005 |
| WO | 2007/0966657 A1 | 8/2007 |
| WO | 200805017 A1 | 5/2008 |
| WO | 2013071953 A1 | 5/2013 |

OTHER PUBLICATIONS

Hull, J., et al.; "Document Image Matching Techniques"; Symposium on Document Image Understanding Technology, Annapolis, MD; Apr. 30-May 2, 1997; XP002358355; pp. 31-35.

Nichols, R.; "ICSA Guide to Cryptography"; 1999; Chapter 22.

Clarke, et al.; "Dynamic Inverted Indexes for a Distributed Full-Text Retrieval System"; Feb. 24, 1995; Dept. of Computer Science, University of Waterloo.

Perry, S., et al.; "A review of the use of inverted files for best match searching in information retrieval systems"; Dec. 10, 1982; Journal of Information Science; vol. 6, No. 2-3 (1983); pp. 59-66; XP009144961.

Navarro, G., et al.; Modern Information Retrieval—Chapter 8: Indexing and Searching; Jan. 1, 1999; ACM Press, New York, New York; pp. 191-228; ISBN: 978-0-201-39829-8; XP002457291.

International Search Report for PCT/GB2007/004035 dated May 7, 2009.

International Preliminary Report and Written Opinion on Patentability for PCT/GB2007/004035 dated Apr. 28, 2009.

International Search Report for PCT/GB2007/004037 dated Mar. 7, 2008.

International Preliminary Report on Patentability and Written Opinion for PCT/GB2007/004037 dated Apr. 28, 2009.

International Search Report for PCT/GB2005/002156 dated Aug. 31, 2005.

International Preliminary Report on Patentability and Written Opinion for PCT/GB2005/002156 dated Dec. 4, 2006.

International Search Report for PCT/GB2007/000668 dated Nov. 5, 2007.

International Preliminary Report on Patentability and Written Opinion of International Searching Authority for PCT/GB2007/000668 dated Aug. 27, 2008.

International Search Report for PCT/EP2008/050372 dated Jul. 21, 2009.

International Preliminary Report on Patentability and Written Opinion of International Searching Authority for PCT/EP2008/050372 mailed Jul. 17, 2009.

International Search Report for PCT/GB2007/002500 dated Oct. 17, 2007.

International Preliminary Report on Patentability and Written Opinion for PCT/GB2007/002500 dated Feb. 17, 2009.

Kazuyuki, M., et al.; "An Efficient Iris Recognition Algorithm Using Phase-Based Image Matching"; Proc. IEEE International Conference on Image Processing, Genoa, 2005; pp. II-49-II-52.

Koichi, I., et al.; "A Fingerprint Recognition Algorithm Using Phase-Based Image Matching for Low-Quality Fingerprints"; Proc. IEEE International Conference on Image Processing; Genoa, 2005; pp. II-33-II-36.

Kong, W.K., et al.; "Accurate Iris Segmentation Based on Novel Reflection and Eyelash Detection Model"; Intelligent Multimedia, Video and Speech Processing; 2001; Proceedings of 2001 International Symposium, May 2-4, 2001; pp. 263-266; Hong Kong; XP10544713.

Kong, W.K., et al.; "Detecing Eyelash and Reflection for Accurate Iris Segmentation"; International Journal of Pattern Recognition and Artificial Intelligence; vol. 17, No. 6 (2003); pp. 1025-1034; World Scientific Publishing, Singapore; XP001171781.

Kumar, B V K, et al.; "Spatial frequency domain image processing for biometric recognition"; Proceedings of 2002 International Conference on Image Processing ICIP 2002; Rochester, NY, Sep. 22-25, 2002; New York, NY; IEEE US; vol. 2 of 3, Sep. 22, 2002; pp. 53-56; XP010607258; ISBN: 0-7803-7622.

Ma, L., et al.; "Efficient Iris Recognition by Characterizing Key Local Variations"; IEEE Trans. on Image Processing; vol. 13, pp. 739-750, 2004.

Lestrel, P.; "Introduction and Overview of Fourier Descriptors"; Fourier Descriptors and Their Applications in Biology, 2001; pp. 22-44; XP008090742; ISBN: 978-0-521-45201-4.

Ma, K-K., et al.; "Unequal-arm Adaptive Rood Pattern Search for Fast Block-matching Motion Estimation in the JVT/H.26L"; IEEE International Conference on Image Processing, ICIP 2003; pp. 1-901-1-904.

Manikandan, M., et al.; "Motion estimation method for video compression—an overview"; Wireless and Optical Communications Networks, 2006 IFIP International Conference.

(56) References Cited

OTHER PUBLICATIONS

Monro, D. M., et al.; "An Effective Human Iris Code with Low Complexity"; Proc. IEEE International Conference on Image Processing (ICIP), Genoa 2005.

Monro, D. M., et al.; "DCT-based Iris Recognition"; IEEE Trans. PAMI, vol. 29, No. 4, pp. 586-595; Apr. 1, 2007.

Namuduri, K. R., et al.; "Computation and performance trade-offs in motion estimation algorithms"; International Conference on Information Technology: Coding and Computing; 2001.

Niemel, L. P. W., et al.; "A Novel Description of Handwritten Characters for Use with Generalised Fourier Descriptors"; European Transactions on Telecommunications and Related Technologies; AEI, Milano, IT; Sep. 1, 1992; pp. 455-464; XP000315364; ISSN: 1120-3862.

Oirrak, A.; "Affine Invariant Descriptors Using Fourier Series"; Pattern Recognition Letters; Elsevier, Amsterdam, NL; Aug. 2002; pp. 1109-1118; XP004349759; ISSN: 0167-8655.

Seow, et al., "Image Based Fingerprint Verification"; 2002 Student Conference on Research and Development proceedings. Shah alam, Malaysia.

Smeaton, A.F., et al., "The Nearest Neighbour Problem in Information Retrieval: An algorithm using upper bounds"; Sigir Forum, ACM, New York, NY, US, vol. 16, No. 1, 1981, pp. 83-87.

Rakshit, et al.; "An Analysis of Image Sampling and Compression for Human Iris Recognition"; IEEE Trans. Information Forensic and Security; vol. 2, No. 3; Sep. 1, 2007; pp. 605-612.

Sener, S., et al.; "Affine Invariant Fitting of Algebraic Curves Using Fourier Descriptors"; Pattern Analysis and Applications; Springer-Verlag; vol. 8, No. 1-2; Sep. 1, 2005; pp. 72-83; XP019381480; ISSN: 1433-755X.

Siewchin, C., et al.; "Iris Authentication Using Privatized Advanced Correlation Filter"; Advances in Biometrics; International Conference Proceedings (Lecture Notes in Computer Science); vol. 3832; 2005; pp. 382-388; XP019026903.

Tourapis, et al.; "New Results on Zonal Based Motion Estimation Algorithms—Advanced Predictive Diamond Zonal Search"; Proceedings of IEEE International Conference of Electronics, Circuits and Systems (ICECS—1999); pp. V-183-V-186; Sep. 1, 1999.

Unel, M., et al.; "Fitting Circle Polynomials to Planar Objects"; Proc. of the First Workshop on Computer Vision, Pattern Recognition and Image Processing; XP002482595; Oct. 23, 1995.

Vijaya, K., et al.; "Iris verification using correlation filters"; Audio- and Video-Based Biometric Person Authentication; 4th International Conference, AVBPA 2003; Proceedings Jun. 9-11, 2003; Guildford, UK; Jun. 9-11, 2003; pp. 697-705; XP002440485, (Lecture Notes in Computer Science, vol. 2688).

Vijaya, K., et al.; "Optimal Tradeoff Circular Harmonic Function Correlation Filter Methods Providing Controlled In-Plane Rotation Response"; IEEE Transactions on Image Processing, IEEE Service Center, Piscataway, NJ, US; vol. 9, No. 6, Jun. 2000; XP011025606; ISSN: 1057-7149.

Wildes, R.P.; "Iris Recognition: An Emerging Biometric Technology"; Proc. of the IEEE; vol. 85, pp. 1348-1363; 1997.

Wyatt, H.; "The Form of the Human Pupil"; Vision Research; Pergamon Press, Oxford, GB; vol. 35, No. 14; pp. 2021-2036; XP001077732; ISSN: 0042-6989.

Zhang, D. D.; "Automated Biometrics Passage"; Automated Biometrics: Technologies and Systems; Kluwer Academic Publishers, Dordrecht, NL; 2000; pp. 170-175; XP002440484.

Wong, W. Y. P., et al., "Implementations of Partial Document Ranking Using Inverted Files"; Information Processing & Management, Elsevier, Barking, GB; vol. 29, No. 5, Oct. 1993 (Oct. 1993), pp. 647-669.

Zhang, D., et al.; "Eyelash Removal Method for Human Iris Recognition"; Proceedings of International Conference on Image Processing; Oct. 8, 2006; pp. 285-288; IEEE, New York, NY, US; XP007902986.

Barron, J.L., et al., "Performance of optical flow techniques"; International Journal of Computer Vision; 12:1:43-77; 1994.

Boles, W. W., et al., "A Human Identification Techniques Using Images of the Iris and Wavelet Transform"; IEEE, 198; pp. 1185-1188.

Bonney, B. et al. "Iris pattern extraction using bit planes and standard deviations"; Conference Record of the Thirty-Eighth Asilomar Conference on Signals, Systems and Computers, 2004; pp. 582-586.

Clarysse, P., "Two-Dimensional Spatial and Temporal Displacement and Deformation Field Fitting from Cardiac Magnetic Resonance Tagging"; Medical Image Analysis, 2000, pp. 253-268; XP002482596.

Da Fontoura Costa, L., "Estimating Derivatives and Curvature of Open Curves"; Pattern Recognition; Elsevier, GB; Nov. 1, 2002, pp. 2445-2451; XP004819285; ISSN: 0031-3203.

Daugman, J., "The Importance of Being Random: Statistical Principles of Iris Recognition"; Pattern Recognition, The Journal of the Pattern Recognition Society; Elsevier Science Ltd.; vol. 36, pp. 279-291; 2003.

Dodis, Yevgeniy, et al., "Fuzzy Extractors: How to Generate Strong Keys from Biometrics and Other Noisy Data"; Advances in Cryptology: Eurocrypt 2004 Lecture Notes in Computer Science; LNCS, Springer-Verlag, BE, vol. 3027, 2004, pp. 523-540.

Du, Y., et al.; "Analysis of Partial Iris Recognition Using a 1-D Approach"; Proceedings of the 2005 IEEE International Conference on Acoustics, Speech, and Signal Processing; Mar. 18, 2005.

Ghosh, et al.; "An Algebra of Geometric Shapes"; IEEE Computer Graphics and Applications, 1993; pp. 50-59.

Horn, B.K.P., et al.; "Determining Optical Flow"; Artificial Intelligence (17), No. 1-3, pp. 185-203; Aug. 1, 1981.

International Preliminary Report on Patentability for PCT/EP2011/070075 dated May 20, 2014 (1 page).

International Search Report for PCT/EP2011/070075 dated Jun. 22, 2012 (4 pages).

Written Opinion of International Searching Authority for PCT/EP2011/070075 dated May 14, 2014 (8 pages).

Bentley, J. L.; "Multidimensional binary search trees used for associative searching"; Communications of the Association for Computing Machinery (ACM), New York, NY; vol. 18, No. 9; Sep. 1, 1975; pp. 509-517; XP008087673; ISSN: 0001-0782; DOI: 10.1145/361002.361007; abstract and 4.1.2 (and 4.1.3).

Hollingsworth, K. P., et al.; "The Best Bits in an Iris Code"; IEEE Transactions on Pattern Analysis and Machine Intelligence, IEEE Service Center, Los Alamitos, CA; vol. 31, No. 6; Jun. 1, 2009; pp. 964-973; XP011266637; ISSN: 0162-8828; DOI: 10.1109/TPAMI.2008.185; abstract, p. 971, col. 1 and 10.

Tsapatsoulis, N., et al.; "Facial image indexing in multimedia databases"; Pattern Analysis and Applications; Springer, New York, NY; vol. 4, No. 2-3; Jan. 1, 2001; pp. 93-107; XP002230774; ISSN: 1433-7541; DOI: 10.1007/PL00014577; abstract, 5.2.1.

Hull, et al. "Document Image Matching Techniques", Symposium on Document Image Understanding Technology, Annapolis, MD, Apr. 30-May 2, 1997, pp. 31-35.

* cited by examiner

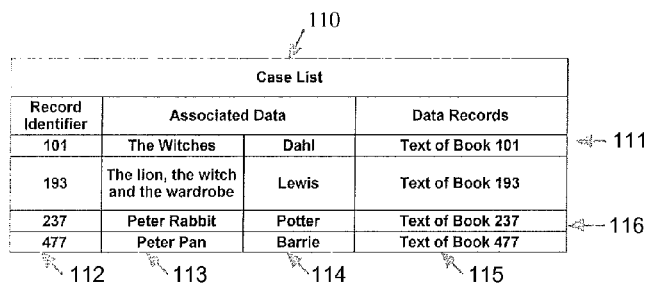
Figure 5  Records of text in a database of books with associated data
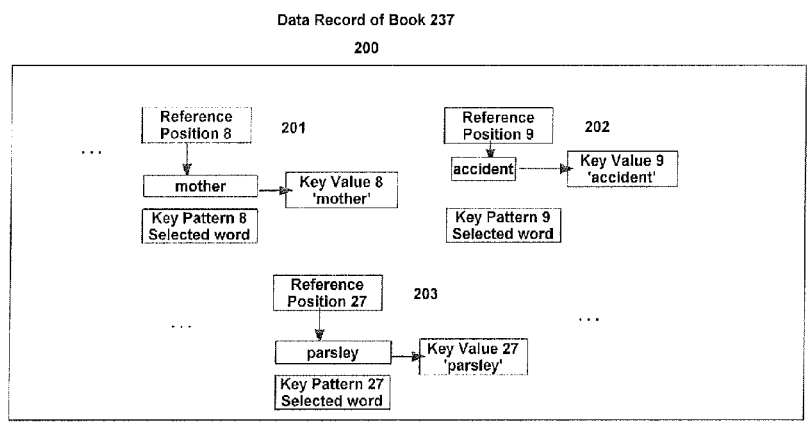
Figure 6  Formation of Key Values from Key Patterns in a Record of Text
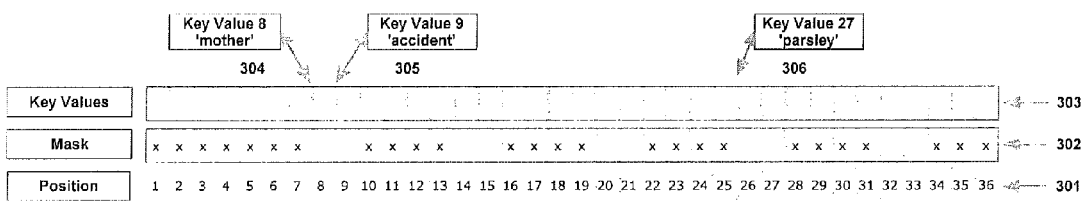
Figure 7  A Mask associated with Reference Positions in a Record of Data

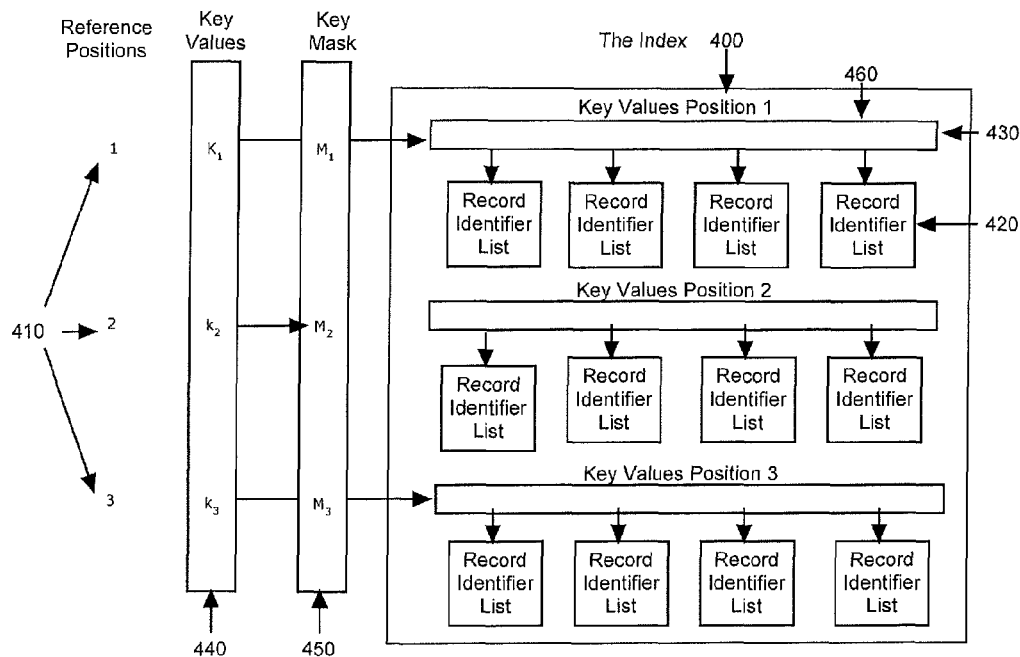

Figure 8    Illustrating lists of Record Identifiers associated with Key Values at Reference Positions through a Key Mask according to an embodiment of the invention.

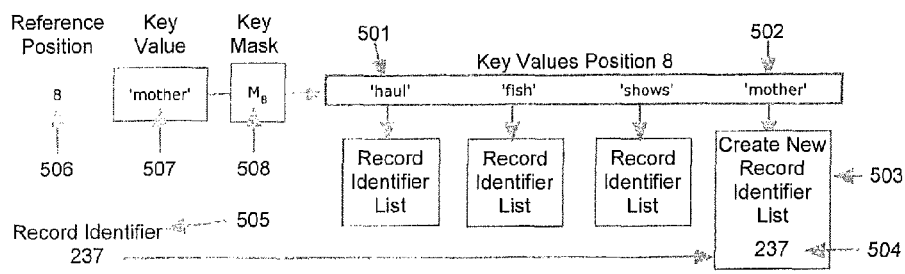

Figure 9    Illustrating how Book 237 is enrolled with Key Value 'mother' in Reference Position 8 if 'mother' is a new Key Value at Reference Position 8.

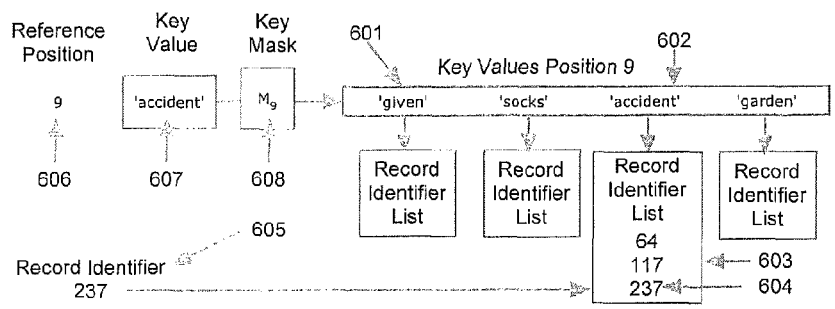

Figure 10    Illustrating how Book 237 is enrolled with Key Value 'accident' in Reference Position 9 if the Key Value 'accident' already exists at Reference Position 9.

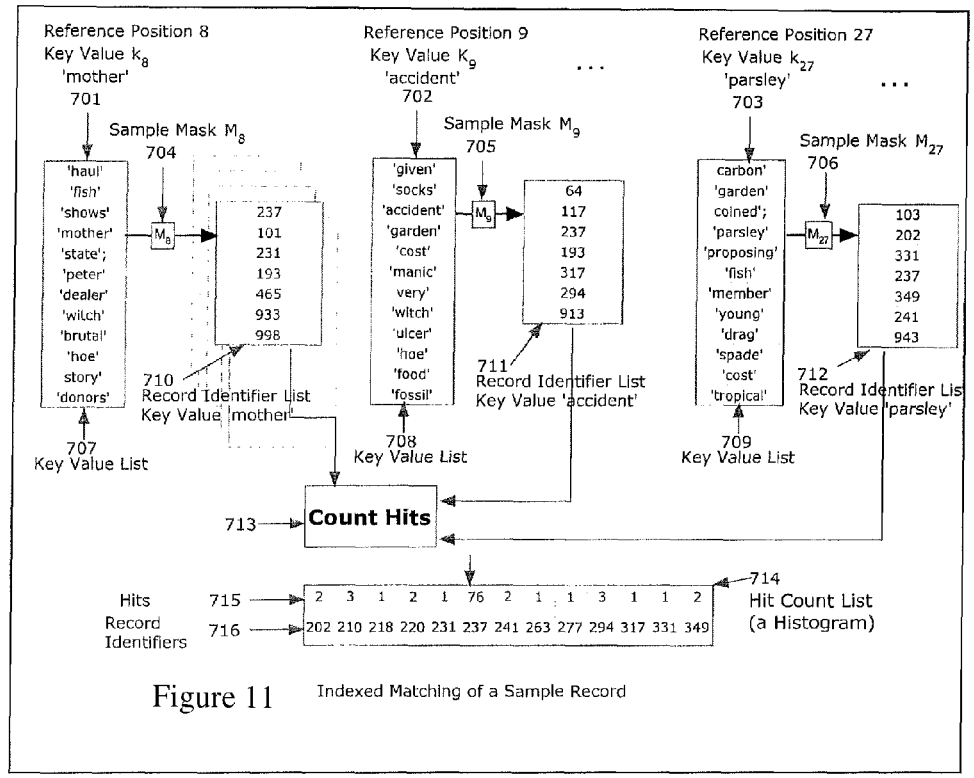
Figure 11   Indexed Matching of a Sample Record
Figure 12
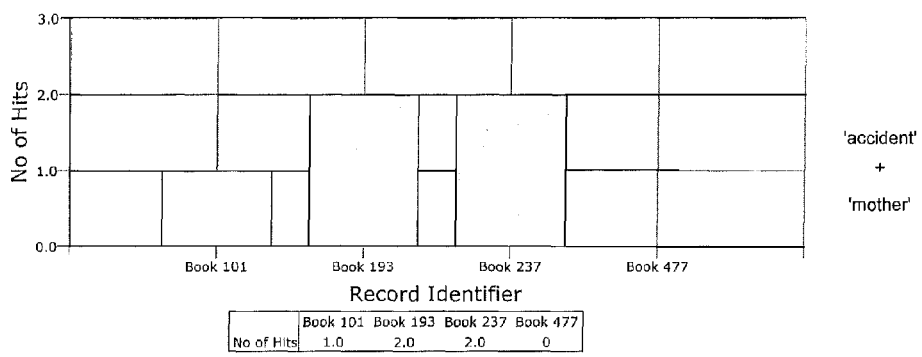

FAST DATABASE MATCHING

CROSS-REFERENCE TO RELATED APPLICATIONS

This application is a continuation-in-part of U.S. application Ser. No. 11/585,365 now abandoned filed Oct. 23, 2006, the contents of which are hereby incorporated by reference. Furthermore, U.S. application Ser. No. 11/585,365 was filed concurrently with U.S. application Ser. No. 11/585,358 entitled "Fuzzy Database Matching," the contents of which is hereby incorporated by reference.

FEDERALLY SPONSORED RESEARCH OR DEVELOPMENT

None.

TECHNICAL FIELD

The invention relates to the field of database systems. In particular, it relates to a method and system for improving the speed with which a candidate or sample record may reliably be matched against a record previously enrolled within the database.

BACKGROUND OF THE INVENTION

There is increasing need within a variety of fields to be able to determine very rapidly whether or not a particular sample record already exists within a large database, and if so to identify one or more matches. One particular field is biometrics, in which the requirement is to determine whether or not the individual who has provided a particular biometric sample is already in the database. A further exemplary field is that of digital rights management, where the need is to check whether a particular piece of music, video, image or text matches a corresponding record within a database of copyright works.

Databases of the type described can be extremely large, and it may be impractical to attempt a full match analysis between the sample record and every one of the records within the database. In order to reduce the computational workload, a variety of pre-screening processes are in use, but many of these have very restricted fields of application since they often rely upon specific peculiarities of the matching algorithm or of the data that are to be matched.

SUMMARY OF THE INVENTION

According to the present invention there is provided a method of identifying possible matches between a sample record and a plurality of stored records, the method comprising:
(a) Defining a plurality of reference positions within a data record, and;
(b) Defining a key pattern related to each said reference position, and;
(c) Combining data from said key pattern into a key value, and;
(d) Associating a list of record identifiers with each said key value for at least some of said reference positions, and;
(e) On enrollment of a data record, providing an enrollment mask associated with said reference positions and adding a record identifier for said data record to said list of record identifiers associated with the key value determined by combining data from said key pattern for at least some of said reference positions where indicated by said associated enrollment mask, and;
(f) On seeking a match for a sample data record, providing sample mask associated with said reference positions and extracting said list of record identifiers associated with the key value determined by combining key patterns for at least some of said reference positions where permitted by said associated sample mask; and,
(g) Determining the number of occurrences of at least one record identifier in the lists associated with said key values for at least some of said reference positions where permitted by said associated reference sample mask; and,
(h) Identifying a given enrolled data record as being a match or possible match with the sample data record if said number of occurrences is at least some required number.

The required number for matching may be determined according to any convenient algorithm, such as a threshold dependent upon the application. The threshold may conveniently be a simple numerical count, or could alternatively be some more complex metric depending not only upon the number of matching key values, but also upon the number of times that those key values match the sample record and/or match the corresponding stored record. By means of the enrolment and sample masks, for example, the numerical count may be modified or scaled according to the particular masks associated with enrolled and sample records.

Any or all of the reference positions, bit patterns and means of forming a key value or list of key values may be hand-crafted (user-generated) or alternatively could be generated automatically from the stored records. The list of key values could be selective (for example, some of the words to be found within the text of a book), or could be comprehensive (all occurring words are automatically added to the list). The key values may all be of the same type or class, but that is not essential and it is contemplated that a single list may contain features of a variety of types (for example, individual words, phrases, font size and font information, layout information and so on). Instead of being a fragment of the stored record, the key values might alternatively be derived in some other way, for example, by hashing of the record or applying some other type of operation to it or to a part of it.

Similarly the enrolment and/or sample masks may be hand-crafted (user generated) or alternatively could be generated automatically from the stored records.

Once a list of possible matches between the sample record and the stored records has been generated, further analysis may be carried out on those retrieved records. Typically, although not necessarily, the sample record and the list of possible matching records may then be passed to a more sophisticated or exhaustive matching algorithm to determine which of the possible matches are true matches.

Such a method provides very fast candidate-matching at the expense of additional effort and memory utilization when registering a new record within the database. The trade-off is well worth while in a system where a record is enrolled only once and subsequently searched against many sample records. This is true of many, if not most applications. It can be of great advantage to devote more processing cost to enrolling than to searching, and as is not generally appreciated, trade faster matching for larger memory.

According to a further aspect of the present invention, there is provided a system for identifying possible matches between a sample record and a plurality of stored records, the system comprising:

(a) A list of key values which occur at selected reference positions, each key value having associated with it those stored records which display said key value;
(b) A processor for matching key values selected by a key value mask against the sample record; and
(c) A processor for identifying a given stored record as being a possible match with the sample if it is associated with a required number of matching key values.

In some embodiments, separate processors may be used for matching key values against sample records, and for identifying stored records as possible matches. These processors may be on separate computers, and may be remote from each other.

In one particular embodiment, the main data list including the full collection of stored records may be held separately from the lists of record identifiers. That allows a local processor, for example, a processor embedded within a photocopying machine, to carry out the initial analysis using key values extracted from a sample record such as a photocopied page of text. Once a list of possible matches has been identified, that list can then be passed to a remote server, where a more detailed analysis can be carried out by comparing the sample with the full text of each of the possible matches.

This approach has the further advantage that the designer of the system does not need to distribute to a large number of users full copies of the entire corpus of copyright works. Instead, each user simply receives a list of key values, which is enough for the initial analysis to be carried locally. Where one or more possible matches are found, the system may then be automatically report to a central location where further analysis can be carried out against the full documents.

One skilled in the art of data base matching will recognize the underlying method described here as a novel variation of what is commonly known as 'reverse indexing', in which a key value is used as an entry to a table giving the identities of data records which display that key value. It is, for example, used in context addressable searching. The present invention adds to that technology a set of specified positions from which the key values are formed which may in some circumstances make the matching accuracy better, and the use of a mask to direct the indexing only to positions in the data known to be suitable for matching.

BRIEF DESCRIPTION OF THE DRAWINGS

The invention may be carried in practice in a number of ways and some specific embodiments will now be described, by way of example, with reference to the accompanying drawings, in which:

FIG. 5 shows records of text in a database of books with associated data according to an exemplary embodiment of the invention;
FIG. 6 illustrates the formation of key values from key patterns in a record of text according to an exemplary embodiment of the invention;
FIG. 7 illustrates a mask that may be associated with reference positions in a record of data;
FIG. 8 shows how lists of Record Identifiers are associated with Key Values at Reference Positions through a Key Mask according to an embodiment of the invention;
FIG. 9 describes the process of enrolment of record identifiers from a data record into a database when the particular key value has not previously occurred at a particular reference position;
FIG. 10 describes the process of enrolment of record identifiers from a data record into a database when the particular key value has previously occurred at a particular reference position;
FIG. 11 illustrates the indexed matching of a sample record;
FIG. 12 is a histogram exemplifying the matching for an example embodiment of the invention.

Figure 1:
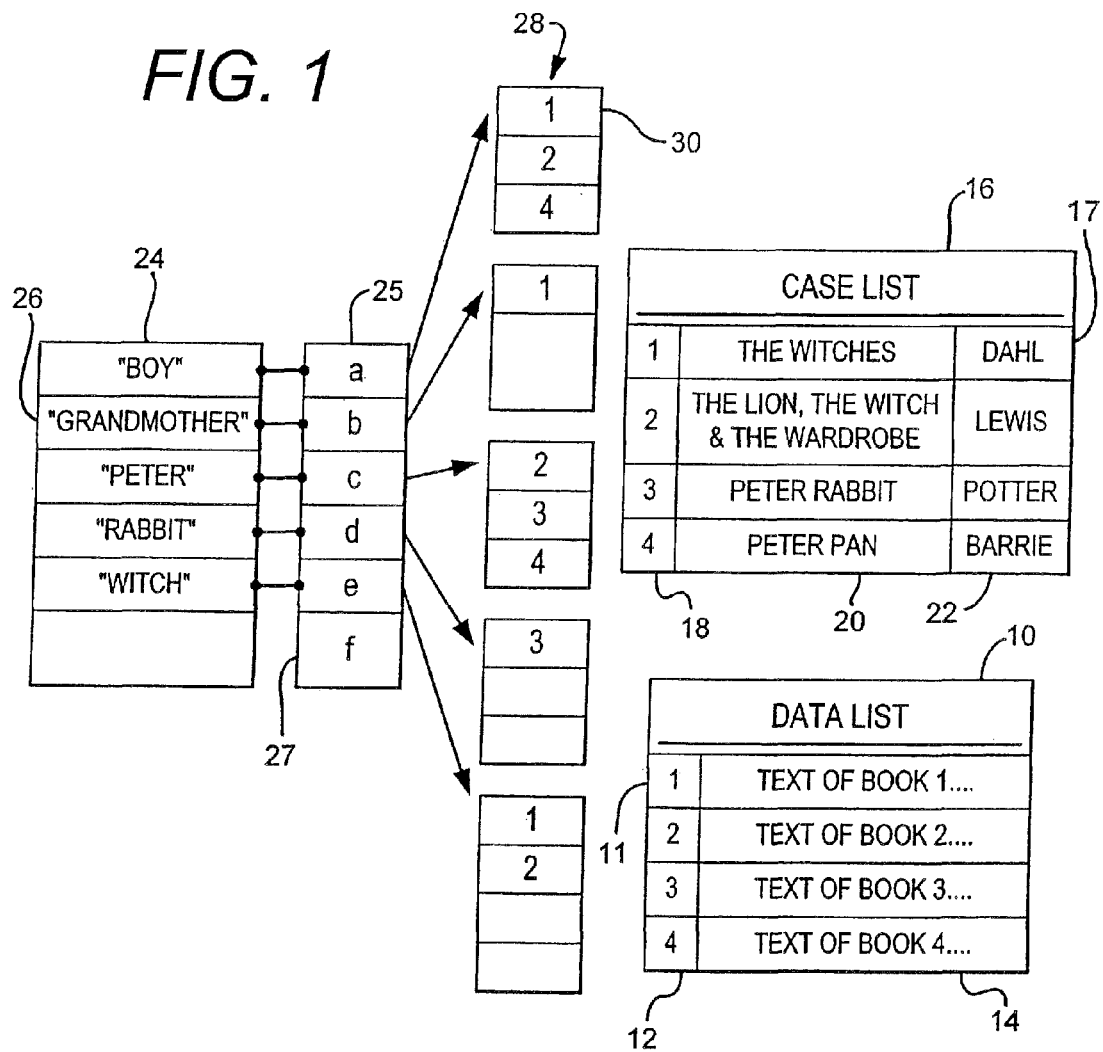
FIG. 1 shows the database structure according to an embodiment of the invention.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description which follow are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing may involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

For the sake of clarity, the description below will be directed toward an exemplary embodiment in the digital rights management field. In the embodiment to be described, a database contains details of a large number of published books which are currently in copyright. A website has been found onto which has been posted lengthy extracts from a variety of books. The task is to determine which, if any, of those extracts have been taken from books which are recorded within the database. It will of course be understood that this particular example is simply used to illustrate the general principles behind the invention, and that the same techniques will be equally applicable in other fields. The invention in its broadest form is not restricted to any particular class or type of data held within the database, nor to the details of the matching algorithms that are used. Of particular although not exclusive interest is the field of iris matching.

DETAILED DESCRIPTION

The database structure of an exemplary embodiment is shown schematically in FIG. 1. Bibliographic details of the individual books within the database are held within a case list or table 16, each row 17 of which represents an individual book. Columns 18, 20, 22 respectively hold a unique reference number, the book title, and the author. Of course, in a practical embodiment, many more details about each individual book would probably be held.

The full text of each book is held within a data list or table 10, each row 11 of which represents an individual book. This table consists of two columns, the first 12 being the unique reference number, mentioned above, and the second 14 holding the complete text of the book in some suitable encoded form. More generally, the column 14 may be considered to hold some generalised representation which uniquely identifies the individual record.

To assist in searching the database, a characteristic list or table 24 is created. Each row 26 holds a variety of different characteristics which may be found within the records of column 14 within the data list 10. These characteristics are selected so as to be reasonably common (but not overwhelmingly so), in at least some of the books. The characteristics may be any easily-measurable attribute of the data, and the type of characteristic chosen will clearly depend upon the application. In some embodiments, as here, the characteristic may be a sub-feature; in others it may be extracted from the data or some part of it by the application of an operation/function such as a hash function.

In the embodiment being described the characteristics are individual words, namely "boy", "grandmother", "Peter", "rabbit" and "witch". Each row in the characteristic table points to a corresponding row 27 within a look-up table 25 which holds a series of pointers which have, here, been designated a, b, c and so on. Each pointer points to a specific memory location which defines the start of an individual case occurrence list 28 which corresponds to the particular linked characteristic within the table 24. There will accordingly, be multiple case occurrence lists, one for each characteristic within the table 24. The individual case occurrence lists 28 are populated with the unique reference number of every book in which that particular characteristic can be found. Conveniently, each row 30 in each list or table simply contains the reference of a single book which includes, displays or demonstrates the relevant characteristic, or from which the characteristic can be extracted.

Thus, in the example shown, the first case occurrence list contains the data 1, 2 and 4, which implies that the characteristic "boy" appears in or can be extracted from the books "*The Witches*", "*The Lion, The Witch and the Wardrobe*" and "*Peter Pan*". The second list which relates to the characteristic "grandmother" consists of a single row which is populated with the reference number 1, indicating that the word "grandmother" occurs in the book "*The Witches*" only.

In another arrangement (not shown) the characteristic table 24 and the lookup table 25 may be merged into a single table having two columns.

The way in which the system is maintained and is used for searching will now be described.

To add a new characteristic (in this example, a new word) the characteristic is added to the list 24 of registered characteristics, in the appropriate position if that list is ordered. A block of memory is allocated for a new case occurrence list, and the relevant pointer added to the look-up table 25. Finally, the new case occurrence list is populated with the reference numbers of those cases, (e.g., books) from which the newly-added characteristic can be extracted.

When a new case (book) is to be registered, the case list 16 and the data list 10 are updated accordingly, and the new case number is then added to the respective case occurrence list for each extracted characteristic. In some embodiments, the list of characteristics 24 may consist all of those characteristics which are contained within or which can be extracted or derived from the entire corpus of data within the data list 10; then, the addition of a new case may automatically trigger the registration of any new characteristics, extracted from the new case, which are not already included within the list 24.

We now turn to the task of matching, or in other words determining whether an unknown data set or sample of text has been taken from one of the books within the database. Rather than matching the sample against the data 14 (the full text of each book), which would be computationally lengthy, characteristics are simply extracted from the sample for comparison with the already-registered characteristics. By referring to the individual case occurrence lists 28, a count may be kept of the number of times a reference to a particular book occurs within a matched table.

In a simplistic embodiment, the matching might be carried out by way of a straightforward row-by-row search through the rows 26 of the characteristic list, but it will often be preferable to avoid this by ensuring that the characteristic list is ordered, and then using some more sophisticated search such as a binary search. Such an approach allows a matching characteristic to be found rapidly, and for a nonmatch to be identified rapidly in the event that the extracted sample characteristic is not registered within the list.

Figure 2:
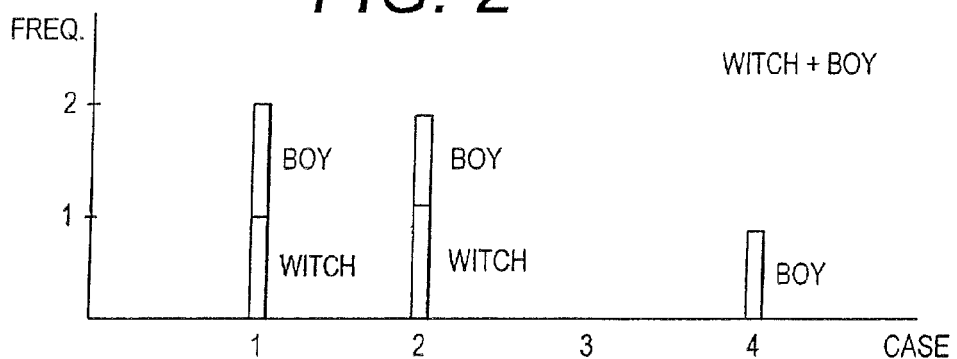
FIG. 2 is a histogram exemplifying the matching process.

FIG. 2 illustrates an example in which the sample text has matched against the characteristics "witch" and "boy". The count is shown schematically as histogram, although such a histogram would not necessarily be plotted in a working embodiment. As may be seen, there are two books in the database that have matched characteristics, namely "*The Witches*" and "*The Lion, the Witch and the Wardrobe*". "*Peter Rabbit*" has no matches, and "*Peter Pan*" one.

Next, a threshold is applied to the count, and any book which scores at least the threshold value is considered to be a candidate match. Here, if the threshold is taken as one, all of the books except *Peter Rabbit* are candidate matches, and if the threshold is taken as two then the candidates are *The Witches* and *The Lion, the Witch and the Wardrobe*.

Figure 3:
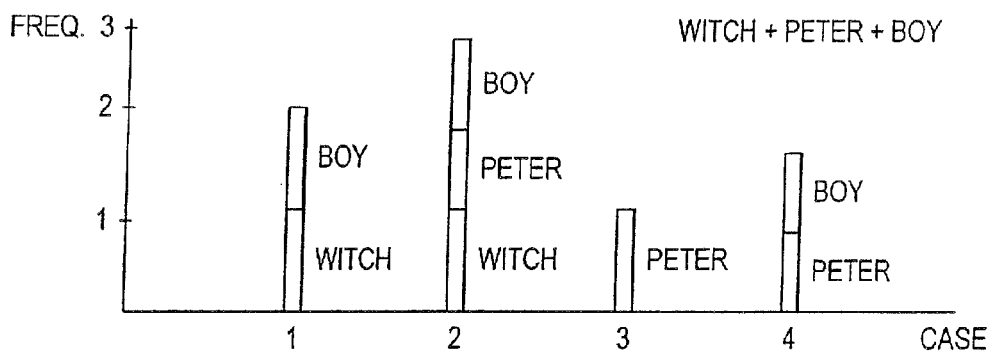
FIG. 3 is another exemplary histogram.

A further example is given in FIG. 3, which represents another text sample in which matches have been found against the characteristics "witch", "Peter" and "boy". If a threshold of two is chosen, all of the books within the database match except for *Peter Rabbit*.

The value of the threshold may be selected by the user by trial and error, according to the particular application and the extent to which the pre-selection process needs to remove a large number of cases from consideration in order to speed up the overall matching process. Although the use of a simple count and a fixed threshold is a convenient way of dividing possible matches from non-matches, other algorithms could equally well be used. One possible approach, for example, would be to select as a candidate match all of those cases having a characteristic count which is more than a fixed percentage higher than the average characteristic count taken across all cases.

Depending upon the size of the sample to be evaluated, it may not be necessary to use the sample in its entirety. For example, if the sample consists of several chapters of a book, it may be enough to carry out the pre-selection based on just one page of text.

The selection of characteristics, the matching criteria and the size of sample to be analysed will in most applications be chosen so that there is an acceptably low risk of a false rejection.

As described above, a characteristic might be a data fragment such as a word or phrase, or could alternatively represent some other attribute of the data. The characteristic might, for example, be extracted or derived from the data by applying to it or to some part thereof an operation such as a hash function. The output of the operation may then be used to access and/or search the characteristic table 24. Where the number of possible characteristics is finite and is known in advance, it may be desirable in some applications for all possible characteristics within a defined characteristic space to be pre-registered. Such an arrangement obviates the need, on matching, to search the characteristic list 24. Instead the sample record is simply processed to extract its characteristics, and the corresponding rows in the table 24 are used as indexes to the case occurrence lists applicable to those particular characteristics.

For example, in a biometric application, the characteristic might be a numeric code of a particular length (e.g., 16 bits, allowing 65536 possible characteristic values to occur). In a database there might be millions or billions of records, so that each possible characteristic may occur many times. To match a sample, one simply extracts one or more characteristics from it, for example, by hashing, and uses the characteristic to address the characteristic table and thus go to straight to the relevant lists 28 of stored records.

In some applications it may even be possible to dispense with the characteristic list 24 entirely. If the list is ordered and contains all possible characteristic values within a defined characteristic space (for example, the numbers 1 to 65536), maintaining the list as a separate entity is unnecessary since all of its values can be inferred. In such a case, a characteristic n which has been extracted from a sample can be used as an index to go straight to row n of the look-up table 25, and thus directly to the corresponding case occurrence list 28.

More generally, where the list of possible characteristics is finite and can be defined in advance, those characteristics can be mapped onto a numerical sequence 1 . . . N. Let us assume that applying the same mapping to a characteristic which has been extracted from an unknown sample gives a value of $n<=N$. If the look-up table 25 is held as a vector L(N), then the location in memory of the relevant case occurrence list 28 for that particular characteristic may be found by looking at the pointer which is held at the position L(n).

It will, of course, be understood that the case occurrence lists 28 may in some embodiments be empty.

Once a list of candidate matches has been selected, using one of the procedures described above, a more detailed match may then be carried out against each of the possibilities, using any convenient matching algorithm. In the text example described, the sample text may be compared word for word against the full text of each of the possible matches.

In one embodiment, the database itself may be held on the same computer or at the same location where the preliminary and/or the final matching takes place. Alternatively, the process may be distributed, with the preliminary matching being carried out according to a characteristic list held at a local computer, and the preliminary matches being passed on to a remote computer for the detailed matching to take place. Such an arrangement allows the primary data list 10 (which includes the full data representing all the cases) to be held at a central location, with a local machine needing to hold just the characteristic list 24 and the individual lists 28.

Figure 4:
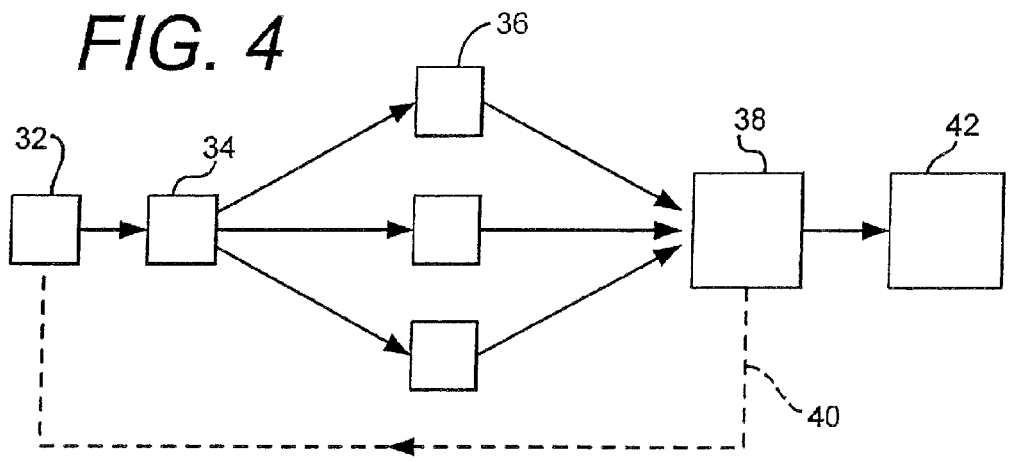
FIG. 4 shows some exemplary hardware.

In another embodiment, shown in FIG. 4, the process of the present invention may further be speeded up by using multiple computers or processors operating in parallel. A user computer 32 forwards a matching task to a controller 34 which splits it up and distributes it between a plurality of computers or processors 36. Each processor 36 may be instructed to handle a particular characteristic or group of characteristics, and is responsible for creating a subset of the case occurrence lists; alternatively, the controller 34 may split up the work in some other way. The processors 36 pass their lists onto a consolidator 38, which finalizes the selection of candidate matches (for example, using the histogram/count procedures illustrated in FIGS. 2 and 3). The list of possibilities is then forwarded as required, either to a computer or processor 42 which carries out more detailed matching, or as shown by reference numeral 40 back to the user 32 for further analysis.

The database structure of this exemplary embodiment is shown schematically in FIG. 5. Details of the individual books within the database are held within a case list or table 110, each row 111 of which represents an individual book. Columns 112, 113, 114 respectively hold a unique record identifier for each book, the book title, and the author. Of course, in a practical embodiment, many more details about each individual book would probably be held. The text of each book is held in the data records of column 115 in some suitable encoded form. It may be convenient to subdivide the text of a book into pages, for example. More generally, the column 114 may be considered to hold some generalised record of data.

In general the representation of data in a database may take many different forms, not limited to the details in FIG. 5 which are specific to the exemplary embodiment may contain many different types of information encoded in many different forms. What is important to the present invention that records of data, such as represented here by the text of a book 115, should be associated with a unique record identifier 114. It will be understood, of course, that the table 110 could be replaced by multiple linked tables in some embodiments.

For purposes of describing the exemplary embodiment, the text of the book Peter Rabbit 116 will be used to describe the enrolment of a the data record and also the matching of a sample record against enrolled data records.

FIG. 6 illustrates the formation of key values from key patterns in a record of text 200 which is taken from the book whose unique record identifier is 237, namely the book 'Peter Rabbit'. Such a record could be a record for enrolment or a sample record for matching. In general, key values may be created from patterns of data at pre-defined or calculated reference positions in a record of data. In the embodiment being described, however, for simplicity the key values are individual words from reference positions in the text in different books. In the book Peter Rabbit, for example, some of these may be "mother" 201, "accident" 202, and "parsley" 203.

In the illustration, the reference positions are on different successive pages, however, the invention is not so limited. In the illustration, the specified data positions are in different places on each page of text. It is not necessary that all pages are chosen, nor that the pages are in any particular order; however, the reference positions chosen should be the same whenever key values are formed for a particular data record. These reference positions need not be fixed however provided there is some means of determining them, for example, by processing of the data itself, such that the reference positions are always the same for the same record of data. For simplicity, individual words of text will be used in the illustration; however, the invention is not so limited. The data patterns used to construct a key value could be of any form and could be different for different reference positions and can be constructed by any method provided that they always form the same key value for a particular reference position in a particular record of data.

To assist in searching the database, a pattern of data positions 201, 202, 203, 204, 205 is created. In the text example, the positions might be on the same or different pages, for example. Related to the specified positions, a pattern of data is created. In the text example this might be individual words or even characters from a pattern related to the chosen page. For simplicity, in the example individual words are chosen. It may, however, give better results in a practical embodiment for the pattern to be a selection of individual characters from particular parts of the page which are therefore unlikely to form a recognizable word. The chosen pattern of data is then combined into a key value, which is the means of referencing the database. In the text example, the key value might be a string of characters made up from the pattern of characters selected for the particular page, and the process of combining them may, for example, be a simple rearrangement, or indeed a mathematical operation which turns the characters into an item of binary data.

In FIG. 6, at the reference position 8 (a place chosen in this example for page 8) the book Peter Rabbit has the word 'mother' 201, which is the key value for reference position 8. Similarly at reference position 9 the key value is 'accident' 202, and jumping forward to reference position 27 the key value is 'parsley' 203. Those taking the trouble to verify this example will find that these words actually occur on these pages in the first edition of 'Peter Rabbit' by Beatrix Potter. The key values are then an easily-measurable attribute of the data, and the type of key chosen will clearly depend upon the application. In some embodiments, as here, the characteristic may be a sub-feature of the data; in others it may be the result of an operation applied to the data, or some part of it, such as a hash function.

It will be evident that the method described in which key values are created from reference positions in a record of data will identify a set of features which are highly specific to a particular record of data. The more reference positions are chosen, the more specific it will be. For example, there will be very few books with 'mother', 'accident' and 'parsley' at specific positions on pages 8, 9 and 27. Perhaps there is only one such book, namely 'Peter Rabbit', but among the many millions of books published one cannot be sure.

Also associated with the embodiment is a mask which is in one to one correspondence with the data positions, which selects which positions in the data are to be entered in the database. Conventionally, a mask is binary although it could be more general providing that it can be used to select or exclude a particular key value for processing. In the text example, a mask may select only certain pages of a book. By means of the mask, books may have different numbers of pages, for example, with pages that do not exist masked out. Other pages from within the book may be masked out, for example, if they contain little or no text, or are missing or incomplete or in some other way unreliable. There are many ways in which this mask may be used, and the examples given are not intended to be limiting.

FIG. 7 illustrates a mask that may be associated with reference positions in a record of data, and is used to select or exclude key values: in the illustrative embodiment using key values from the book 'Peter Rabbit'.

For illustration the positions are shown as a list 301, although no such physical list of positions is actually necessary provided that the formation and use of key values is always associated implicitly or explicitly with a reference position.

The key values associated with the positions are also shown as a list, although no such physical list of key values is necessary provided every key value is associated implicitly or explicitly with a reference position.

Similarly, the mask is shown as a list 302, although no such physical list is necessary provided every key value used in an embodiment has a mask associated with it and is associated implicitly or explicitly with a reference position. Such a mask could be one which selects all positions or no positions either implicitly or explicitly (but those are but special cases of the present invention).

In the illustrative example of a database of books, FIG. 7 shows how the mask is associated with the reference positions in the book 'Peter Rabbit' to select only pages on which words of the story actually occur: pages 8, 9, 14, 15, 20, 21, 26, 27, 32, 33 for example, have text, others may be illustrations or may be blank. Such a mask may be used with the present invention either when enrolling or matching records of data.

For enrolment, it is clearly only useful to select reference positions where there is useful data. Similarly for matching its only useful to select reference positions where there is useful data. These selected positions may, in general, be different for different instances of the same data for enrolment or matching. Therefore in some embodiments of the present invention, the mask may be enrolled with the data. If that is done, then on matching account can be taken of the number of reference positions that actually contribute to a particular mask by finding the intersection of the enrolled mask and the mask presented with sample data for matching, and using it to influence a decision about whether a sample record may match an enrolled mask. This will be discussed further below.

Enrol and sample records may have different masks, and therefore not all enrolled values may be used for matching.

In general, the use of the mask prevents spurious key values from participating in matching and may therefore enhance the accuracy of masking, preventing, for example, false matches.

In the case-specific alternative of matching the code of a biometric iris, the specified positions may be a subset of portions of the iris known to be reliable, for example, avoiding ill defined boundaries of positions where reflections are known to occur. For example, the reflection of the nose from the surface of the cornea is a feature known to degrade recognition of irides. Such a mask may be fixed for a set or subset of irides enrolled in a database. However, the mask may be used to exclude portions of a particular iris that are nor useful, for example, an eyelid which conceals the iris texture. The eyelid position will in practice be slightly different in every data record of the same eye, so this mask may be different for an enrolled iris and a sample iris from the same eye. For that reason it is valuable to store the mask of every enrolled iris. Finally, different matches will involve different numbers of iris positions, so in particular embodiments the intersection of the masks, i.e., the number of positions where both enrolment and sample masks allow data to be recovered, might be used to enhance the matching score of a relatively highly masked pair of data records, further improving the accuracy of the method.

Intelligent use of masks may allow the method to be used in applications where data positions may be variable rather than fixed, for example, in fingerprints where the relationship between features is more important than their exact position. Groups of features can be enrolled as keys in the database at several positions, and then on matching keys from a sample record can be matched against sets of positions.

FIG. 8 shows how lists of Record Identifiers are associated with Key Values at Reference Positions through a Key Mask according to an embodiment of the invention. FIG. 8 illustrates the masked index 400 with multiple reference positions 410. To construct the database, a separate record identifier list 420 is created for each of the chosen key values 430 at each of the reference positions 410. A list of key values 440 is presented and selected by a mask 450 either for enrolment or for matching as appropriate.

In the case of the database of books, then, there could be a list of key values 430 created for each page. Each row 430 holds a variety of different key values which may be found as in FIG. 5 within the records of column 115 within the case list 110.

For illustration the reference positions are shown as a list 410, although no such physical list of positions is actually necessary provided that the formation and use of key values 440 is always associated implicitly or explicitly with a reference position.

The key values associated with the positions are shown as a list 430, although no such physical list of key values is necessary provided that every key value used is associated implicitly or explicitly with a reference position.

Similarly, the mask is shown as a list 450, although no such physical list is necessary provided every key value has a mask associated with it and is associated implicitly or explicitly with a reference position. Such a mask could be one which selects all positions or no positions either implicitly or explicitly (but those are but special cases of the present invention).

Finally, in the exemplary embodiment, the lists of identifiers 420 associated with each key value 430 for each selected position 410 within the individual key value lists 430 are populated with the reference number of every book in which that particular key value 460 can be found at that reference position, but only if the reference position is selected by the mask 450. Conveniently, each row in each record identifier list 420 or table simply contains the reference number of a single book which includes the relevant key at the relevant position, as will be further described below.

The way in which the system is maintained and is used for searching will now be described.

In the example embodiment, whenever a new book is to be registered or enrolled within the database, its details are added to the case 110 and a check is carried out to see which of the keys values 430 are contained at the particular reference positions 410 within that new book. The book's record identifier is then added, as appropriate, to the individual record identifier occurrence lists 420. If desired, one or more new key values may be added to the key value lists 430, in which case additional record identifier lists 420 are automatically created.

FIG. 9 illustrates enrolment of a book in the database when a key value is not previously known at a particular reference position. For enrolment, a record identifier 505, reference position 506, key value 507 and key mask 508 are provided in any way which may be convenient to an embodiment. While enrolling book 237, 'Peter Rabbit' as at 116 in FIG. 5, at reference position 8 the key value 'mother' 507 is formed as at 201 in FIG. 6. Because reference position 8 506 is selected for enrolment by the key mask 508f or 'Peter Rabbit' at 304 in FIG. 3, the key value list for reference position 8 at 501 in FIG. 9 is examined and it is seen that no book with the key value 'mother' 507 has previously been enrolled for this position. As the process of enrolment involves checking the key value list 501 for previous enrolment of a key value at a reference position, it will be clear to one skilled in the art that there may be a speed advantage if the key value list 501 is ordered, although the present invention is not limited to key value lists 501 which are ordered. In the present example, because the key value 'mother' does not exist in the key value list 501, it is necessary to add 'mother' to the list 501, either at the end 502 as illustrated, or if the list is ordered by insertion at the appropriate place, preserving the link of each key value with its record identifier list. In addition a new record identifier list 503 is created and the record identifier of the new data record is stored as its first record identifier 504, in this case, the identifier '237' of 'Peter Rabbit'.

FIG. 10 illustrates enrolment of a book in the database when a key value is previously known at a particular reference position. As before for enrolment, a record identifier 605, reference position 606, key value 607 and key mask 608 are provided in any way which may be convenient to an embodiment. While enrolling book 237, 'Peter Rabbit' as at 116 in FIG. 5, at reference position 9 the key value 'accident' is formed as at 202 in FIG. 2. Because reference position 9 is selected for enrolment by the key mask for 'Peter Rabbit' at 305 in FIG. 7, the key value list for reference position 9 at 601 in FIG. 9 is examined and it is seen that no book with the key value 'mother' has previously been enrolled for this position. As the process of enrolment involves checking the key value list 601 for previous enrolment of a key value at a reference position, it will be clear to one skilled in the art that there may be a speed advantage if the key value list 601 is ordered, although the present invention is not limited to key value lists 601 which are ordered. In the present example, because the key value 'accident' exists in the key value list 601, it is not necessary to add 'accident' to the key value list. To enrol 'accident; at reference position 9, the record identifier of the new data record is added to the record identifier list for 'accident' 603 at 604, in this case the identifier '237' of 'Peter Rabbit'. In the description which follows below of matching new data records against the database it will be clear to one skilled in the art that there may be a speed advantage if the record identifier list 503, 603 is ordered, although the present invention is not limited to record identifier lists which are ordered. In the present example, when adding the record identifier '637' for 'Peter Rabbit' to the record identifier list 603 at 604, '637' may be added to the record identifier list 603, either at the end 604 as illustrated, or if the list is ordered it may be added by insertion at the appropriate place.

We now turn to the task of matching, or in other words, determining whether an unknown sample of text has been taken from one of the books within the database.

Rather than matching the sample against the data 115 (the full text of each book), which would be computationally lengthy, instead at selected reference positions 201, 202, 203 selected key values from the text sample 303, 404 are matched against the database. By referring to the record identifier lists 420 a count may be kept of the number of times a particular book occurs within the record identifier lists of an enrolled record. A sample mask 450 may be associated with the test sample, to exclude or include particular portions of the sample data. For example, only selected pages may be available. By this means great flexibility in the selection of key values and the reference positions in which they match may be used.

Two kinds of matching tasks are common in the fields of use, namely 1:1 matching in which one is required to verify whether a sample record is a match with a particular chosen data record, and 1:N matching in which a sample record is to be matched against a database of N enrolled records with no prior knowledge of the expected answer. The present invention can be used for both purposes, although the illustrative embodiment is concerned with the 1:N case when a sample of text is compared against an entire database of enrolled books to seek a match. A match will occur if a sufficient number of key values at selected reference positions return the same record identifier. It may be an exact match in either 1:1 or 1:N matching if a particular key value occurs at all selected reference positions. It may rarely occur that more than one enrolled record gives an exact match. Otherwise it may be a partial match. Depending on the application further processing may be desirable if there are several candidate record identifiers with a sufficient number of occurrences, or 'hits' in either the 1:1 or 1:N cases.

FIG. 11 illustrates the indexed matching of a sample record which is the text of case 237, the book 'Peter Rabbit' in a database index such as 400 after a significant number of books have been enrolled. To carry out the match as illustrated by FIG. 11, a number of key values $k_8$ 701, $k_9$ 702, $k_{27}$ 703 are provided together with mask values $m_8$ 704, $m_9$ 705, $m_{27}$ 706, all taken from a sample record. The sample record may be an exact match to a book in the database, as for example, 'Peter Rabbit' at these positions. The sample record may be a partial match, as for example, 'Peter Rabbit' with pages missing or key values in error. The sample record may be from a different book which happens to have the same key values at some positions.

In the illustrative database, the enrolled key values are held in lists 707, 708, 709 for each reference position which are not ordered. In other embodiments this list may be ordered or may not physically exist. To match, the key values from a reference position of the sample are used to look up in the database the record identifier list 710, 711, 712 for the particular key value at the particular reference position. In some embodiments where the appropriate record identifier list may be selected by some automatic method, therefore, the key value lists may not physically exist. However, the record identifier lists are physically created and maintained.

In FIG. 11, for example, at reference position 8 the key value '$k_8$ mother' is presented 701 and the key mask $m_8$ 704 indicates this to be a selected position. Assuming selection by the mask, a record identifier list 710 is selected which contains all the record identifiers of all data records which contain the selected key value at the selected reference position 701. All the record identifiers in the selected record identifier list 710 are passed to a means of counting the occurrences or 'hits' on particular data records 713. In the case of 1:1 matching this may consist simply of counting the hits at a particular sample record identifier that has been presented for verification. Operation of the index in this way to provide a 1:1 verification is but one way of using the masked indexed structure of the present invention. In the case of 1:N matching of an unknown sample record in FIG. 11 counting of hits may at 713 be by a more general method, including but not restricted to the formation of a histogram or bin-count 714 for at least some of the record identifiers in the database. Such a histogram counts the hits 715 for a selection of record identifiers 716 could be created and initialised in advance, for example, or on the fly as a sample match proceeds.

Having processed the key value for reference position 8 in the example, the processing can continue to extract and count record identifiers from selected record identifier lists in which a key value is enrolled at selected reference positions. In general, the occurrences of record identifiers are counted at reference positions which match a key value extracted from the reference positions and selected by a mask.

In the example embodiment of text from pages of a book, then, if the key values 'mother', and 'accident' are presented at reference positions 8 and 9, there are in total two hits from the lists of FIG. 11 on record identifier 237 which is 'Peter Rabbit' but also two hits on record identifier 193 which is 'The lion, the witch and the wardrobe'. This is illustrated by the histogram of FIG. 12. Numerous other record identifiers may occur with one hit such as 101 'The Witches' or zero hits such as 477 'Peter Pan'. Therefore at this stage in the matching process there may be two candidates for matching, 'Peter Rabbit' and 'The lion, the witch and the wardrobe'. If only these two key values had been presented, then one has the choice of carrying on with more key values, or perhaps making a lengthy comparison of the two data records indicated. This may not be onerous, for example, if millions of books are enrolled and only these two books are to be compared. However it is likely that more reference positions would be used, as in FIG. 11. One may go directly to reference position 27, for example, and present the key value 'parsley' as at 703 in FIG. 11, and find a third hit for 'Peter Rabbit', but no more hits that increase any hit value in the histogram beyond 2, as in FIG. 13. At this point one may decide to cease processing and accept 'Peter Rabbit' as a match, or one might continue to present further key values as in FIG. 11 until the histogram or other counting means produces an answer that the embodiment considers definitive. Of course there may be no such match in which case the sample record remains unknown, or there may be several candidate matches making a further decision process such as exhaustive comparison desirable.

FIG. 12 illustrates an example in which the sample text has matched against the key values "mother" and "accident". The count is shown schematically as histogram, although such a histogram would not necessarily be plotted in a working embodiment. As may be seen, there are two books in the database that have two matched key values, namely "*The Lion, the Witch and the Wardrobe*" and "*Peter Rabbit*". "*The Witches*" has one match and "*Peter Pan*" has none.

Next, a threshold is applied to the count, and any book which scores at least the threshold value is considered to be a candidate match. Here, if the threshold is taken as one, all of the books except *Peter Pan* are candidate matches, and if the threshold is taken as two then the candidates are *The Lion, the Witch and the Wardrobe* and *Peter Rabbit*.

Figure 13:
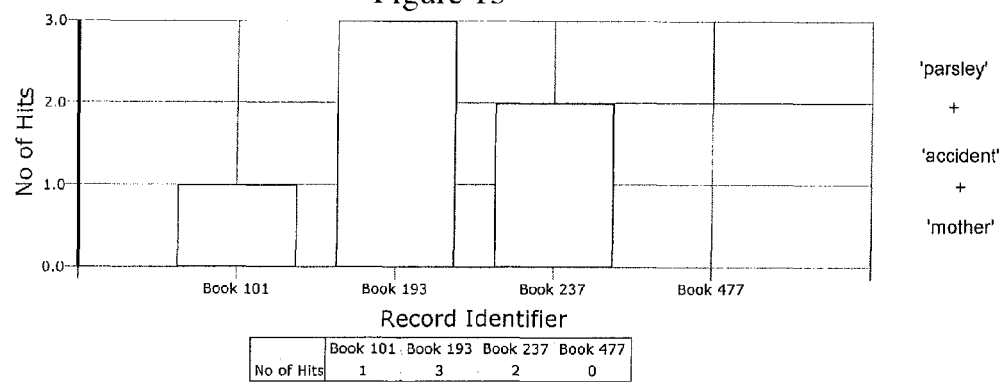
FIG. 13 is another exemplary histogram.

A further example is given in FIG. 13, which represents another text sample in which matches have been found against the key values "mother", "accident" and "parsley". If a threshold of three is chosen, a match has been found in *Peter Rabbit*.

The value of the threshold may be selected by the user by trial and error, according to the particular application and the extent to which the pre-selection process needs to remove a large number of cases from consideration in order to speed up the overall matching process. Although the use of a simple count and a fixed threshold is a convenient way of dividing possible matches from non-matches, other algorithms could equally well be used. One possible approach, for example, would be to select as a possible match all of those cases having a record identifier count which is more than a fixed percentage higher than the average (e.g. mean, median or mode) characteristic count taken across all cases.

According to another aspect of the invention, it may be advantageous to scale the numbers of hits observed according to the numbers of key values used in matching. If a sample record is presented to a database for matching, then different data records may have been enrolled with different numbers of reference positions selected. The data records may have been of different lengths, for example, in the case of books the number of pages may vary widely, so that it is possible that a short book such as 'Peter Rabbit' which has only 17 pages with text may be matched against a much more substantial volume such as 'The lion, the witch and the wardrobe' with over 200 pages. Because of the difference in size, in general a longer text may have more hits that a shorter one. The present invention can provide a means of correcting for differences in the number of reference positions selected using the key value mask. On enrolment a key value mask provided for enrolment may be saved for data records. On matching a different key value mask may be presented with the sample data. Record identifiers from the selected record identifier lists will only be recovered if they are selected on both enrolment and matching. Assuming all pages of text from 'Peter Rabbit' and 'The lion the witch and the wardrobe' are enrolled, then if all key values from 'Peter Rabbit' are presented for a match, only 17 hits will occur on the enrolled Peter Rabbit and there is a danger, however small, that some other larger text will produce a similar number of hits. If, however, we know the enrolment and sample masks, it is possible to calculate the 'intersection' of the masks, that is, the number of reference positions where both masks select key values for processing by the index. The number of hits can then be scaled in some manner using the statistics of the masks.

A practical example of scaling the hits in matching masked data records may be in the field of biometrics, for example, in matching data records which are templates coded from images of human irides. Suppose for this example that the number of reference positions in an enrolled template is always the same, $s_t$. An enrolled template may, for example, be accompanied by a mask of length $s_t$ which indicates that some regions of the iris are not to be processed, for example eyelids, eyelashes and unwanted reflections particularly but not exclusively from sources of illumination. Only key values selected by the mask presented at enrolment may be used to select record identifier lists 503 where record identifiers are entered 504. The number of positions where the record identifier is entered in a record identifier list will usually be less than the total number of reference positions used, $s_t$, because of the masking. To use this feature the mask presented at enrolment may be saved in the database and associated with the record identifier in some way. Later, on presenting a sample for 1:1 or 1:N matching, only those reference positions selected by the sample mask are used for retrieval of the record identifiers indicated by the key value. The sample mask will, in general, be different from the mask saved at enrolment. Therefore, the number of reference positions from which the matching identifier may produce hits is reduced still further. Thus the number of hits will always be no greater than the number of positions selected by both masks, which we call the intersection $s_i$, often considerably less. One method of scaling may therefore be to scale the number of hits according to $$\text{Scaled Hits} = \text{Raw Hits} * \frac{s_t}{s_i}$$

By this scaling, a matching iris which has its number of hits arising from matching, here called the Raw Hits, will in general have its score increased if the combined effect of the sample and enrollment mask reduces the number of available reference positions. This may make the Scaled Hits a more reliable indication of the quality of a match, and may lead to a smaller number of false matches in practice. However, if very few reference positions are available because of very heavy masking leading to a small intersection, it may be better to reject a data record rather than risk a false match which could be the result of a large scaling factor $$\frac{s_t}{s_i}.$$

This factor could of course be infinite, although one skilled in the art would be expected to avoid this occurring. In practice a large scaling factor may be a very rare event, but should be borne in mind, for example, in some biometric systems where a false match may be considered far more serious than a false rejection.

Depending upon the size of the sample to be evaluated, it may not be necessary to use the sample in its entirety. For example, if the sample consists of several chapters of a book, it may be enough to carry out the pre-selection based on just one page of text.

The selection of key values, the matching criteria and the size of sample to be analysed will in most applications be chosen so that there is an acceptably low risk of a false rejection.

As described above, a key value might be a fragment or pattern of data of a stored record, or it might alternatively be derived in some other way from the stored record, for example, by applying some operation such as a hash function. The latter approach may be advantageous in some applications since it can avoid the need to carry out a search when matching the sample record. Instead, the sample record is simply processed (e.g., by hashing) to extract one or more key values from it, these then directly being used as indexes to a list of key values with pointers to all the lists of stored records which contain those particular keys.

Where the number of possible key values is finite and is known in advance, it may be desirable in some applications for all possible key values within a defined range to be pre-registered. Such an arrangement obviates the need, on matching, to search the key values lists 430. Instead the sample record is simply processed to extract its key values, and subject to selection by the mask, the corresponding rows in the lists 430 or 707, for example, are used as pointers to the record identifier lists applicable to those particular key values.

In certain embodiments, explicit or physical key value lists may not be necessary, for example, in a biometric database where key values may be 16 bit numbers, in which case there are 2^16 (65536) possible key values and hence 2^16 (65536) possible record identifier lists for each reference position. It may be convenient for all of these record identifier lists to be created when the database is initialised and before any cases are enrolled. In such a situation great efficiency may be achieved if the lists are held in order and accessed through a list of pointers. If the arrangement of the record identifier lists is organized according to some pattern, it may be possible to access the appropriate record identifier lists by processing the key values and dispense with any form of list or pointer.

On the other hand, as in the text example, lists of key values may be stored in the database, and a search may be required to determine if the key value exists and where its associated record identifier list is to be found. Clearly if such a list of key values is ordered there may be strategies for locating the key values and associated lists quickly, for example, by a binary search of the values and an associated list of pointers to the lists of record identifiers. However, the present invention is not limited by any particular method of associating a key value with a record identifier list and those skilled in the art may identify many such methods.

In the illustrative embodiment, for example, the key values do not represent every possible word and every possible position, but are stored in lists of key values 430, 701, 702, 703. It is accordingly necessary to examine the lists when carrying out a match. This might be done by a straightforward search of key values at a reference position to determine if a sample key value exists. A similar search is carried out at enrolment as described above. However when matching, nothing will be added to the database, but instead information will be extracted from the record identifier lists to determine to what extent the sample record matches a data record already enrolled in the data base.

For example, in a biometric application, the key value might be a numeric code of a particular length (e.g., 16 bits, allowing 65536 possible characteristic values to occur). In a database there might be millions or billions of records, so that each possible key value may occur many times. Thus, having a plurality of reference positions and using a mask may enhance the performance of the database. To match a sample, one simply extracts one or more key values from it at the reference positions, for example, by hashing, and uses the key values to look up addresses for the relevant lists of record identifiers.

In some applications it may even be possible to dispense with the key value lists 430 entirely. If the list is ordered and contains all possible characteristic values within a defined characteristic space (for example, the numbers 1 to 265536), maintaining the list as a separate entity is unnecessary since all of its values can be inferred. In such a case, a key value n which has been extracted from a sample can be used as an index to go straight to row n of a look-up table and thus directly to the corresponding record identifier list.

More generally, where the list of possible key values is finite and can be defined in advance, those key values can be mapped onto a numerical sequence 1 . . . N. By applying the same mapping to a key value which has been extracted from an unknown sample gives a value of n<=N. If a look-up table is held as a vector L(N), then the location in memory of the relevant record identifier lists 430 that particular characteristic may be found by looking at the pointer which is held at the position L(n). If the locations of the record identifier lists are arranged in some regular manner, then processing of the key values may lead directly to the appropriate record identifier lists without the need for any lookup table. Other methods of accessing record identifier lists from the key values will occur to those skilled in the art.

Once a list of possible candidate matches has been selected, using one of the procedures described above, a more detailed match may then be carried out against each of the possibilities, using any convenient matching algorithm. In the text example described, the sample text may be compared word for word against the full text of each of the possible matches.

In one embodiment, the database itself may be held on the same computer or at the same location where the preliminary and/or the final matching takes place. Alternatively, the process may be distributed, with the preliminary matching being carried out according to a characteristic list held at a local computer, and the preliminary matches being passed on to a remote computer for the detailed matching to take place. Such an arrangement allows the primary case list 110 (which includes the full data representing all the cases) to be held at a central location, with a local machine needing to hold just the key value lists 430 (if any) and the individual record identifier lists 420.

Figure 14:
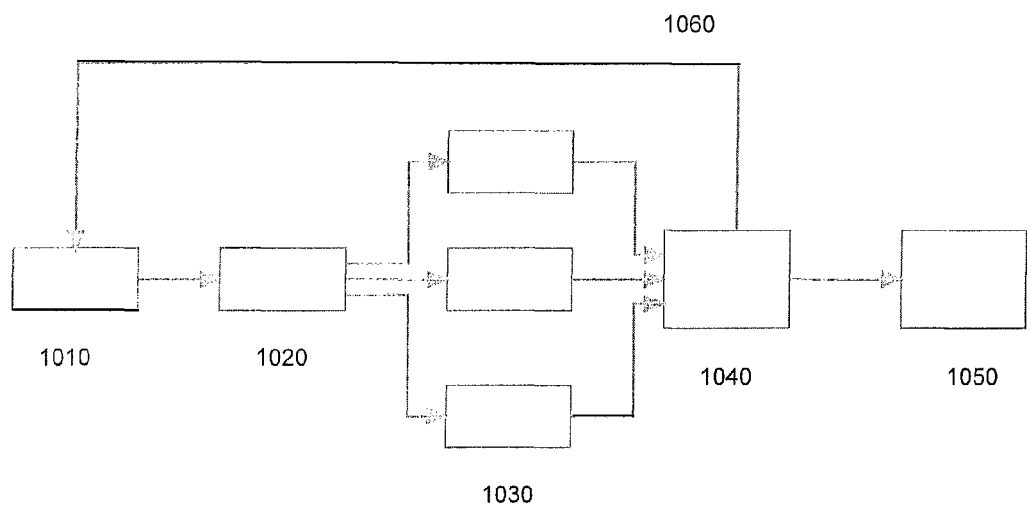
FIG. 14 shows some exemplary hardware.

In another embodiment, shown in FIG. 14, the process of the present invention may further be speeded up by using multiple computers or processors operating in parallel. A user computer 1010 forwards a matching task to a controller 1020 which splits it up and distributes it between a plurality of computers or processors 1030. Each processor 1030 may be instructed to handle a particular characteristic or group of keys; alternatively, the controller 1020 may split up the work in some other way. The processors 1030 pass their results onto a consolidator 1040, which finalises the selection of possible matches (for example, using the procedure illustrated in FIG. 11. The list of possibilities is then forwarded as required, either to a computer or processor 1050 which carries out the detailed matching or as shown by reference numeral 1060 back to the user 1010 for further analysis.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method of identifying a possible match between a sample data record and any in a plurality of enrolled data records in a data base, each enrolled data record comprising a first plurality of data positions, the method comprising:
   a) prior to initiating a process for matching a sample data record separate from the data base with one of the enrolled data records in the data base, without first associating the sample data record with one of the enrolled data records, designating a second plurality of reference positions among the first plurality of data positions in a first enrolled data record, some of which reference positions in said first enrolled data record are separated by other data positions in said first enrolled data record, each reference position corresponding to a location in said first enrolled data record at which a key value, useful as a characteristic feature for identifying said first enrolled data record, is positioned, there being a first key value at a first enrolled data record reference position and a second key value at a second enrolled data record reference position, the totality of said key values providing an identification for distinguishing said first enrolled data record from others in the plurality of enrolled data records;
   b) providing, for at least said first enrolled data record, an enrollment mask comprising a series of enrollment mask data positions, each corresponding to one in the first plurality of data positions in said first enrolled data record, the enrollment mask including at least first and second enrollment mask reference positions corresponding to first and second enrolled data record reference positions, wherein the first key value is associated with said first enrollment mask reference position and the second key value is associated with said second enrollment mask reference position to match a sample record with said first enrolled data record;
   c) for the sample data record, defining a sample mask comprising sample mask data positions, each corresponding to a data position in said first enrolled data record, including first and second sample mask reference positions corresponding to said first and second enrollment mask reference positions and corresponding to the first and second reference positions in the enrolled data record reference positions;
   d) associating said first key value with said first sample mask reference position and associating said second key value with said second mask reference position to identify in the sample record presence of at least said first and second key values at positions corresponding to reference positions in said first enrolled data record that are associated with said first and second key values; and
   e) applying the sample mask to the sample data record to determine whether the first and second key values are at positions in the sample data record corresponding to the first and second sample mask reference positions to identify a possible match between the sample data record and said first enrolled data record.

2. The method of claim 1 further including, when applying the sample mask to the sample data record, determining the number of occurrences in which key values of the first enrolled data record are identified and determining whether the possible match exists between the sample data record and said first enrolled data record based on whether the number of occurrences meets a threshold value.

3. The method of claim 2 wherein the number of occurrences is determined by processing an enrolled mask with the sample mask.

4. A method according to claim 2, wherein determining the number of occurrences of key values includes:
   building a histogram of the numbers of hits for a plurality of data record identifiers; and
   identifying data records as possible matches from the histogram.

5. The method according to claim 2 wherein processes for applying the sample mask, determining numbers of occurrences in which key values are identified and determining whether a possible match exists are performed for the plurality of enrolled data records among a plurality of processors operating on parallel, each processor forwarding a match result to a consolidator, said consolidator identifying stored data records as possible matches in dependence upon said match results.

6. The method of claim 2 in which said first enrolled data record is stored for possible further processing.

7. The method of claim 6 including the additional step of further analysing the relationship between the sample data record and each possible matching data record.

8. The method of claim 1 wherein the second plurality of reference positions among the first plurality of data positions is based on the first plurality of enrolled data records.

9. The method of claim 1 wherein record identifiers associated with the key values are stored within a database table for reference positions in said first enrolled data record.

10. The method of claim 9 wherein said record identifiers define key values that could occur in said plurality of reference positions.

11. The method of claim 9 in which said key values are implicit and are not separate from the record identifiers.

12. The method of claim 9 in which the record identifiers are provided as an ordered list of key values.

13. The method of claim 9 in which one or more pointers are maintained linking at least some of said key values to said record identifiers.

14. The method of claim 13 wherein the pointers are held in a lookup table.

15. A system for identifying possible matches between a sample data record and a plurality of enrolled data records, the system comprising:
   a processor; and
   memory storing instructions which, when executed by the processor, cause the processor to perform the steps of:
   a) prior to initiating a process for matching a sample data record separate from the data base with one of the enrolled data records in the data base, without first associating the sample data record with one of the enrolled data records, designating a second plurality of reference positions among the first plurality of data positions in a first enrolled data record, some of which reference positions in said first enrolled data record are separated by other data positions in said first enrolled data record, each reference position corresponding to a location in said first enrolled data record at which a key value, useful as a characteristic feature for identifying said first enrolled data record, is positioned, there being a first key value at a first enrolled data record reference position and a second key value at a second enrolled data record reference position, the totality of said key values providing an identification for distinguishing said first enrolled data record from others in the plurality of enrolled data records;

b) providing, for at least said first enrolled data record, an enrollment mask comprising a series of enrollment mask data positions, each corresponding to one in the first plurality of data positions in said first enrolled data record, the enrollment mask including at least first and second enrollment mask reference positions corresponding to first and second enrolled data record reference positions, wherein the first key value is associated with said first enrollment mask reference position and the second key value is associated with said second enrollment mask reference position to match a sample record with said first enrolled data record;

c) for the sample data record, defining a sample mask comprising sample mask data positions, each corresponding to a data position in said first enrolled data record, including first and second sample mask reference positions corresponding to said first and second enrollment mask reference positions and corresponding to the first and second reference positions in the enrolled data record reference positions;

d) associating said first key value with said first sample mask reference position and associating said second key value with said second mask reference position to identify in the sample record presence of at least said first and second key values at positions corresponding to reference positions in said first enrolled data record that are associated with said first and second key values; and e) applying the sample mask to the sample data record to determine whether the first and second key values are at positions in the sample data record corresponding to the first and second sample mask reference positions to identify a possible match between the sample data record and said first enrolled data record.

16. The system of claim 15, wherein the memory stores additional instructions which, when executed by the processor, cause the processor to perform the steps of:
  determining a number of occurrences of the key values based on two or more reference positions in said first enrolled data record that are separated by other positions in said first enrolled data record;
  based on the number of occurrences of key values, determining whether said first enrolled data record is a possible match with the sample data record;
  storing a list of record identifiers; and
  scaling said number of occurrences.

17. The system of claim 16 wherein the list of record identifiers is stored within a database table for a reference position in at least one in the plurality of enrolled data records.

18. The system of claim 15 wherein the plurality of reference positions is calculated from the plurality of enrolled data records.

* * * * *